United States Patent
Zhang et al.

(10) Patent No.: US 9,120,216 B2
(45) Date of Patent: *Sep. 1, 2015

(54) WORKING COMPONENT FOR MATING WITH MULTIPLE SHAFT ENDS

(75) Inventors: Xiaofeng Zhang, Nanjing (CN); Baijun Zhang, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 608 days.

This patent is subject to a terminal disclaimer.

(21) Appl. No.: 13/005,103

(22) Filed: Jan. 12, 2011

(65) Prior Publication Data

US 2011/0316241 A1 Dec. 29, 2011

(30) Foreign Application Priority Data

Jun. 25, 2010 (CN) .......................... 2010 1 0218657
Oct. 27, 2010 (CN) .......................... 2010 1 0539398

(51) Int. Cl.
*B23B 31/02* (2006.01)
*B25F 1/00* (2006.01)
*B23D 61/00* (2006.01)
*B24B 23/04* (2006.01)
*B24B 27/08* (2006.01)
*B24B 45/00* (2006.01)
*B27B 5/32* (2006.01)

(52) U.S. Cl.
CPC ............... *B25F 1/00* (2013.01); *B23D 61/006* (2013.01); *B24B 23/04* (2013.01); *B24B 27/08* (2013.01); *B24B 45/00* (2013.01); *B27B 5/32* (2013.01); *Y10T 279/33* (2015.01); *Y10T 279/3406* (2015.01)

(58) Field of Classification Search
CPC ........................... B27B 5/32; Y10T 279/3406
USPC .......... 279/141, 143–145; 451/357, 359, 356; 83/698.41, 665, 666

See application file for complete search history.

(56) References Cited

U.S. PATENT DOCUMENTS

| | | | |
|---|---|---|---|
| 4,657,428 A | 4/1987 | Wiley | |
| D360,946 S * | 8/1995 | Goris | D24/146 |
| 5,554,165 A | 9/1996 | Raitt et al. | |
| 5,702,415 A | 12/1997 | Matthai et al. | |
| 7,189,239 B2 * | 3/2007 | Fisher et al. | 606/82 |
| 2008/0210212 A1 * | 9/2008 | Baratta | 125/15 |
| 2010/0009613 A1 | 1/2010 | Frueh | |
| 2010/0056029 A1 * | 3/2010 | Grunikiewicz | 451/442 |
| 2011/0309589 A1 * | 12/2011 | Maras | 279/143 |

FOREIGN PATENT DOCUMENTS

DE 20122817 U1 2/2008
DE 202010013008 U1 2/2011

* cited by examiner

*Primary Examiner* — Eric A Gates
*Assistant Examiner* — Chwen-Wei Su
(74) *Attorney, Agent, or Firm* — Greenberg Traurig, LLP

(57) ABSTRACT

A working component for mating with multiple shaft ends includes a body portion and a clamping portion which is connected to the body portion and suitable for mounting the working component to the shaft ends. The body portion has a work piece processing area for acting on the work piece to be processed and the clamping portion has a mounting hole with a longitudinal axis Y. The clamping portion includes a support portion and a mating portion which are overlapped along the direction of the longitudinal axis Y.

19 Claims, 10 Drawing Sheets

A—A

WORKING COMPONENT FOR MATING WITH MULTIPLE SHAFT ENDS

RELATED APPLICATION

This application claims the benefit of CN 201010539398.8, filed on 2010 Oct. 10, and CN 201010218657.7, filed on 2010 Jun. 25, the disclosures of which are incorporated herein by reference in their entirety.

BACKGROUND

This disclosure relates to a working component and, more particularly, to a working component for mating with the shaft end of the output shaft which may be driven by oscillating.

At present, some multifunctional tools having changeable working components are available in the tool market. The changeable working component is mounted on the shaft end of the output shaft of the multifunctional tool so that the multifunctional tool has multiple functions and may be suitable for multiple work conditions. The multifunctional tool is also called an oscillating tool with the following working principle: the multifunctional tool is provided with a motor driver in the body thereof, and performs an oscillating movement through an eccentric output shaft mounted into a spherical bearing and driven by a shift fork, thereby bringing the working component to perform an oscillating movement, thus the process of the work piece to be processed is achieved. The different working components may have different specific functions, such as a saw blade for cutting or a sanding paper for burnishing, etc., wherein the saw blade is a common working component in the multifunctional tools.

At present, some brands of the multifunctional tools are available in the market, such as a DREMEL brand, a FEIN brand, a WORX brand, etc. The multifunctional tool of each brand is equipped with working components of the same respective brand, but the different working components of different brands cannot be used commonly. That is to say, when the user has a multifunctional tool of one brand, he has to buy the working component of the same brand if he needs to buy a changeable working component, and the working components of other brands cannot be mounted to his own multifunctional tool. Therefore, the existing working components do not have good commonality, which causes the trouble to the users.

SUMMARY

The present disclosure describes a working component with good commonality, which can be mated with multiple shaft ends. To this end, a working component for mating with multiple shaft ends includes a body portion and a clamping portion which is connected to the body portion and suitable for mounting the working component to the shaft end. The body portion has a work piece processing area for acting on the work piece to be processed and the clamping portion has a mounting hole with a longitudinal axis Y. The clamping portion includes a support portion and a mating portion which are overlapped along the direction of the longitudinal axis Y.

With the above technical solution, the working component can be mated with multiple shaft ends having different shapes; meanwhile, the mating portion is directly arranged on the support portion of the working component, thus it reduces the number of the accessories of the multifunctional tool and obtains a good portability; moreover, the mating portion and the support portion are formed by a stamping process, thus it reduces the manufacturing cost and simplifies the technology procedure as compared with the die casting process needed in the prior art.

DETAILED DESCRIPTION

Figure 1:
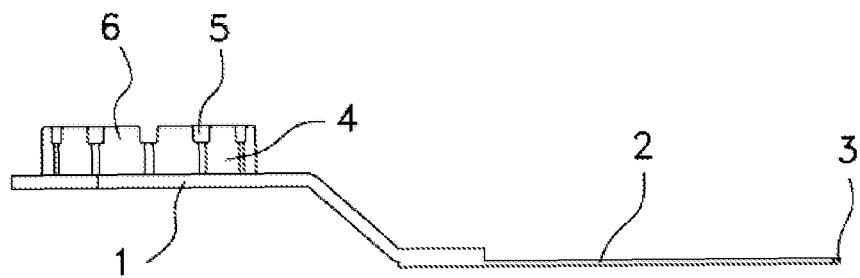
FIG. 1 is a front view of an exemplary working component for mating with multiple shaft ends, wherein the working component is a saw blade.
Figure 2:
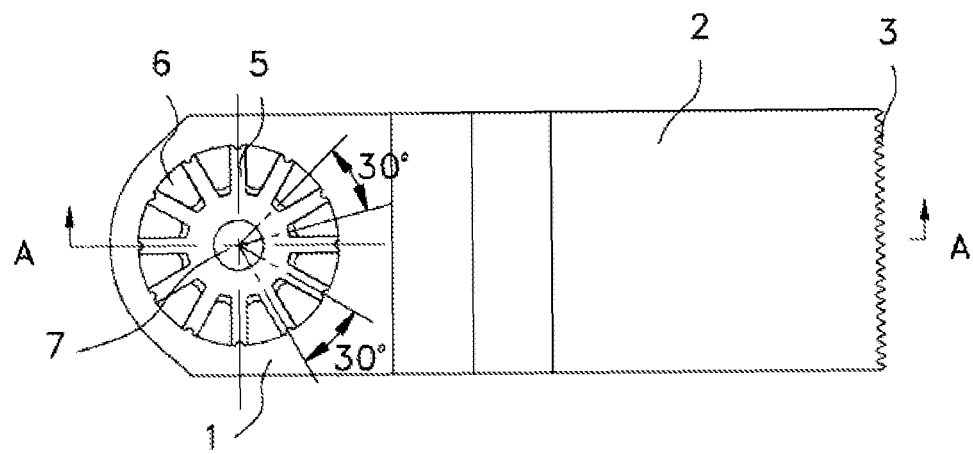
FIG. 2 is a top view of the saw blade of FIG. 1.
Figure 3:
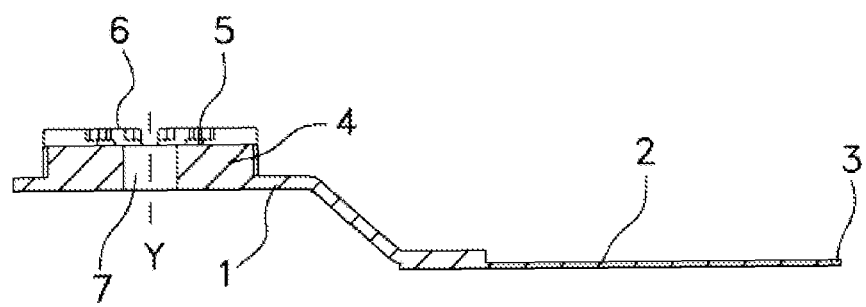
FIG. 3 is a sectional view of the saw blade of FIG. 2 taken along line A-A.

As shown in FIGS. 1-7, a saw blade commonly used as a working component with an oscillating tool is illustrated as a first embodiment. The saw blade includes a body portion 2 and a clamping portion which is connected to the body portion 2 and suitable for mating with the shaft end of the multifunctional tool. The front end of the body portion 2 includes a saw teeth area 3 which may act on the work piece to be processed for cutting. The clamping portion for connecting the saw blade to the shaft end of the tool includes a support portion 1 and a mating portion 4. The mating portion 4 is formed integrally with the support portion 1. Certainly, in other embodiments, the mating portion 4 may be fixedly connected to the support portion 1 by welding, riveting, bolt or other connections. A plurality of grooves 5 and a plurality of projections 6 radially extending through one another are arranged radially and alternately on the end surface of the mating portion 4 (for clarity, only one groove and one projection are indicated by numerals). The support portion 1 also has a mounting hole 7 with a longitudinal axis Y. Preferably, twelve grooves and twelve projections are provided. Preferably, the grooves and the projections are distributed uniformly over an angular range and radially around the longitudinal axis Y, that is to say, the grooves and the projections preferably extend radially, and two adjacent grooves are separated by 30 degrees (i.e., the central lines of the two adjacent grooves are also separated by 30 degrees), two adjacent projections are also separated by 30 degrees (i.e., the central lines of the two adjacent projections are separated by 30 degrees). In other embodiments, the grooves and the projections may be distributed non-uniformly around the longitudinal axis, and a different number of grooves and projections may also be provided.

Figure 4:
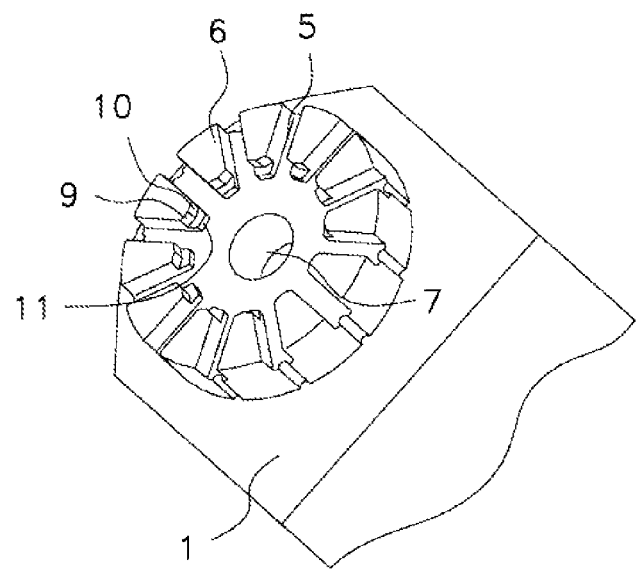
FIG. 4 is a perspective view of the support portion of the saw blade of FIG. 1.

FIG. 4 shows a perspective view of the support portion 1 of the saw blade. A stepped surface 6' arranged in the inner side of the projection 6 adjacent to the longitudinal axis Y divides the inner side of the projection 6 into upper and lower portions along the extension direction of the longitudinal axis Y. The portion above the stepped surface 6' is a V-shaped portion and formed by a first side 9 and a second side 10 with a certain angle therebetween. The angle is preferably 150 degrees, and the first side 9 and the second side 10 are substantially parallel to the longitudinal axis Y. The portion below the stepped surface 6' is a flat surface portion, which is preferably formed by a flat surface 11 substantially parallel to the longitudinal axis Y, and thus a positioning hole with the longitudinal axis Y as the central line is formed. The radial distance between the V-shaped portion of the projection 6 and the longitudinal axis Y is larger than that between the flat surface portion of the projection 6 and the longitudinal axis Y.

Figure 6:
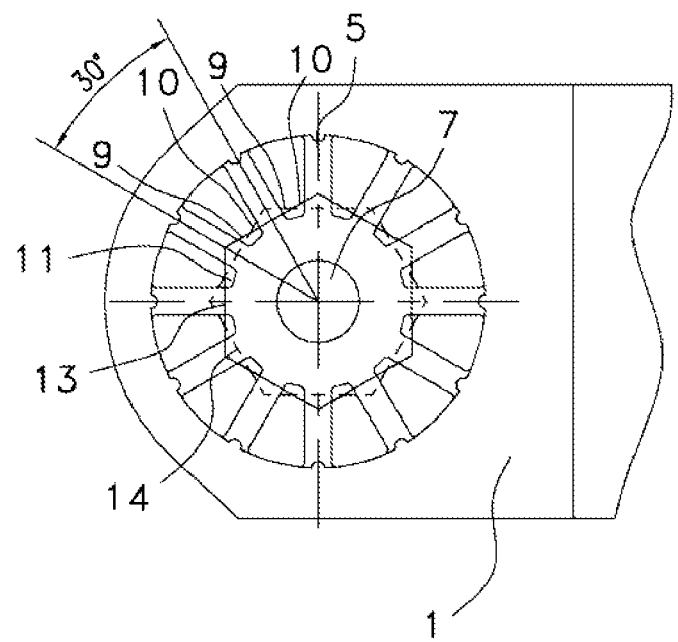
FIG. 6 is a schematic view showing that the saw blade mated with another shaft end.

Referring to FIG. 6, the first sides 9 of some projections 6 and the second sides 10 of the other projections 6 separated mutually are located on the edges of a first polygon 13 with the longitudinal axis Y of the mounting hole 7 as the center, and the second sides 10 of some projections 6 and the first sides 9 of the other projection 6 separated mutually are located on the edges of a second polygon 14 with the longitudinal axis Y of the mounting hole 7 as the center. Preferably, the first polygon 13 and the second polygon 14 are regular hexagons, which are arranged as another positioning hole to mate with some shaft ends. The second polygon 14 is located at the position where the first polygon 13 is rotated about the longitudinal axis Y by a certain angle which is preferably 30 degrees.

Preferably, the radius of the mounting hole 7 is smaller than the minimum distance between each side of the positioning hole (for example, the first polygon and the second polygon) and the longitudinal axis Y. When the working component is mounted to the shaft end of the tool by a spacer and bolt, the section of the support portion positioned between the contour of the mounting hole and that of the positioning hole is overhanging relative to the shaft end, thus it may be pressed by the spacer and the bolt towards the shaft end so as to be deformed slightly towards the shaft end along the longitudinal axis Y, and then it easily obtains a reliable connection relative to the support portion without any deformation.

It is to be understood that with the stepped surface arranged at the inner side of the projection of the mating portion adjacent to the longitudinal axis Y and the V-shaped portion and the flat surface portion formed with different distances from the longitudinal axis, it enables the saw blade to be mated with tools having output shaft ends with different standards, shapes and structures, and operators may adjust the saw blade to the different positions at different angles around the longitudinal axis Y largely with regard to the output shaft end, in order to meet the cutting requirements under different work conditions and enhance the commonality of the saw blade.

Figure 5:
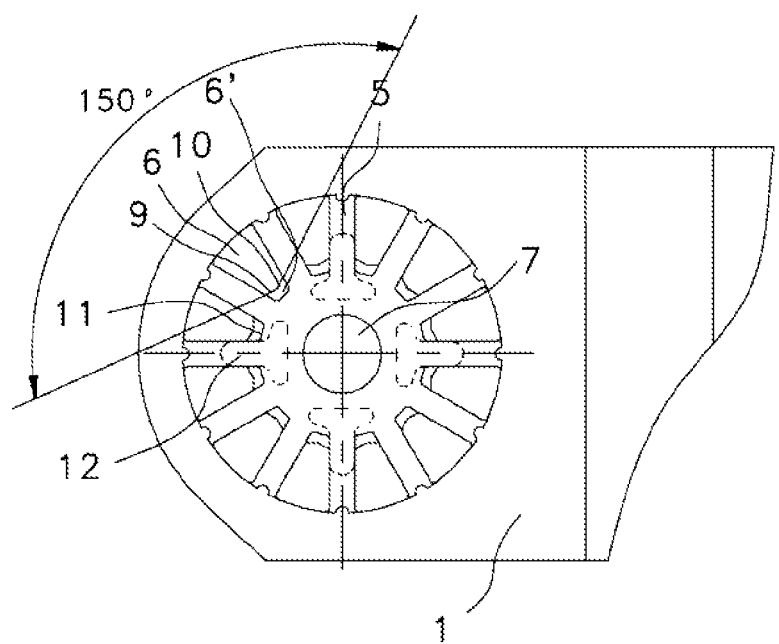
FIG. 5 is a schematic view showing that the saw blade mated with a shaft end.

In addition, in a preferable embodiment of the present invention, the grooves on the mating portion of the saw blade are distributed radially around the longitudinal axis Y, such that the saw blade may be mated with different output shafts having separated projections distributed in the radial direction of the shaft end. For example, FIG. 5 illustrates that the saw blade according to the preferred embodiment of the invention is mated with an output shaft having a shaft end with four T-like shaped projections. One branch of the T-like shaped projection is embedded into the groove 5 extending through radially, and positioned circumferentially by the sides of the adjacent projections 6. The saw blade according to the preferred embodiment of the invention may also be mated with the shaft ends of which the projections have other forms, for example, the shaft end may have a circle of cylindrical or other shaped projections which are distributed around the longitudinal axis and suitable for being inserted into the grooves of the mating portion of the saw blade for mating.

In other embodiments, the first polygon and the second polygon may have other, different number of sides.

Figure 7:
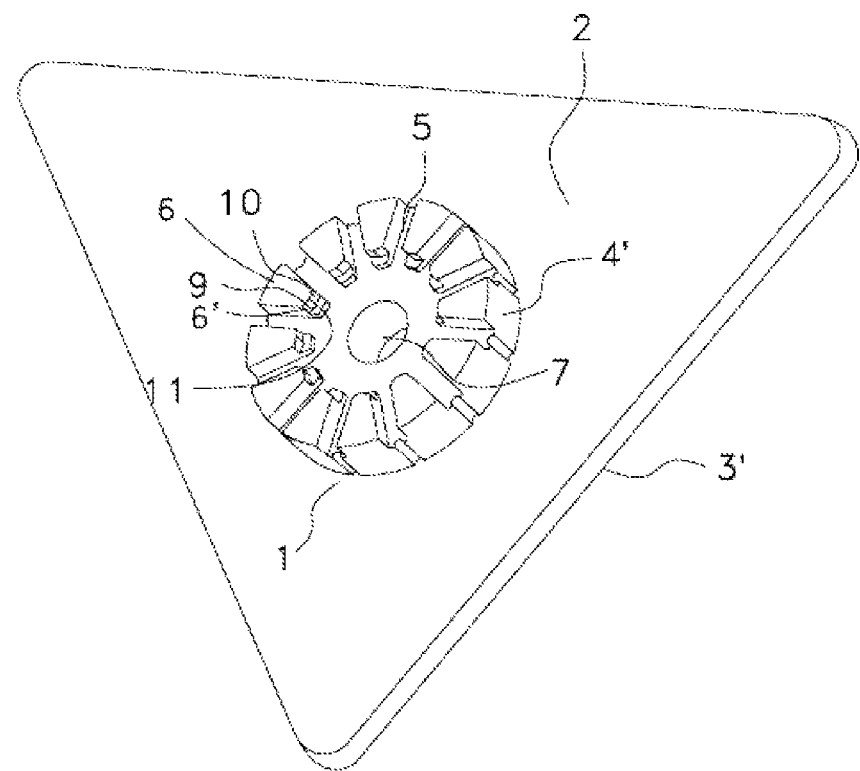
FIG. 7 is a schematic view of another exemplary working component for mating with multiple shaft ends, wherein the working component is a sanding component.
Figure 8:
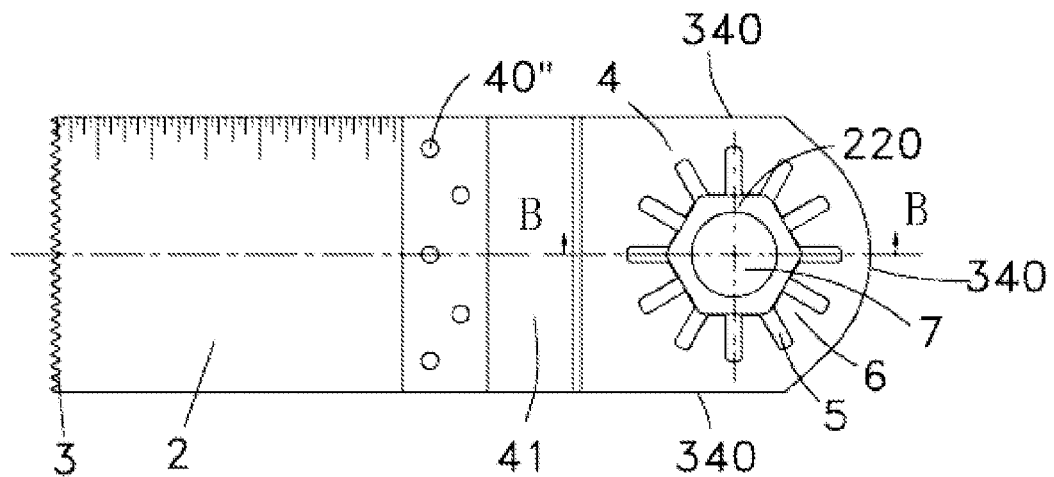
FIG. 8 is a top view of an exemplary working component for mating with multiple shaft ends according to a second embodiment.
Figure 9:
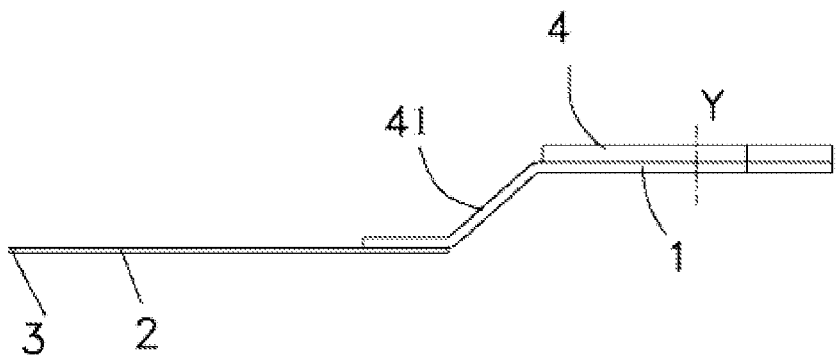
FIG. 9 is a front view of the working component of FIG. 8.
Figure 10:
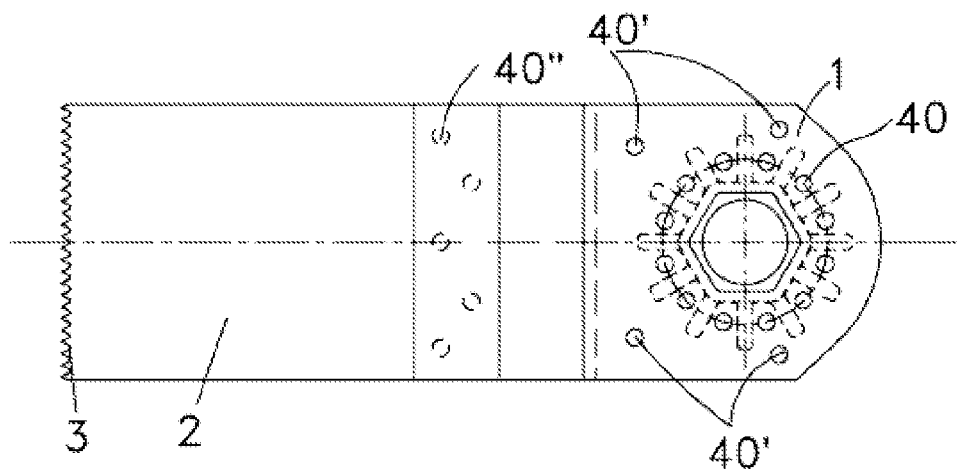
FIG. 10 is a bottom view of the working component of FIG. 8, showing the arrangement of the welding joints on the clamping portion of the working component clearly, wherein the invisible portions in the bottom view are indicated by dotted lines.
Figure 11:
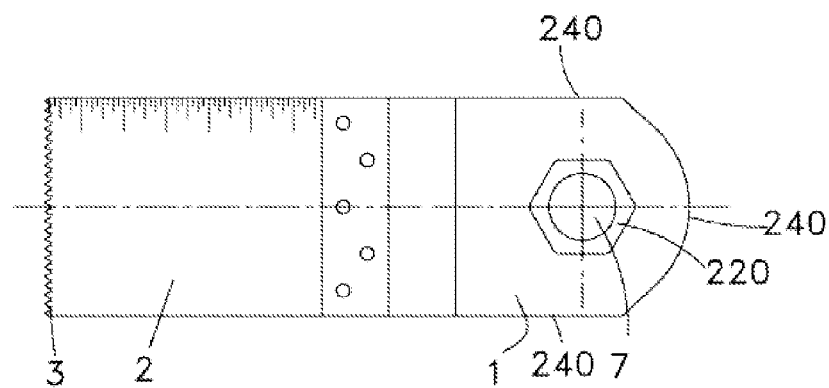
FIG. 11 is a top view showing the support portion of the working component of FIG. 8 before the mating portion is welded.
Figure 12:
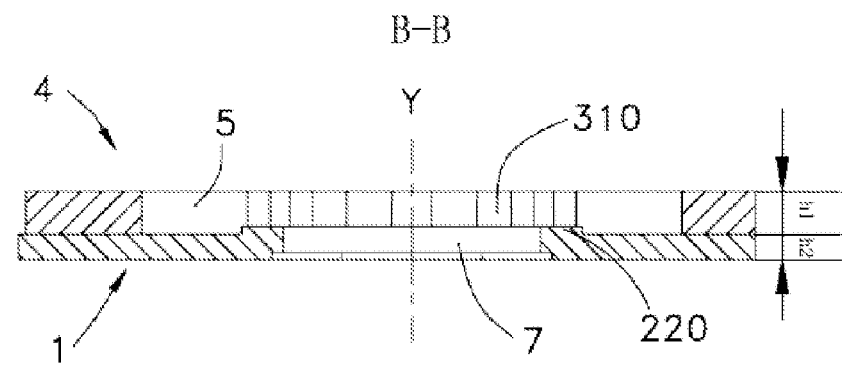
FIG. 12 is a sectional view of the working component of FIG. 8 taken along line B-B.
Figure 13:
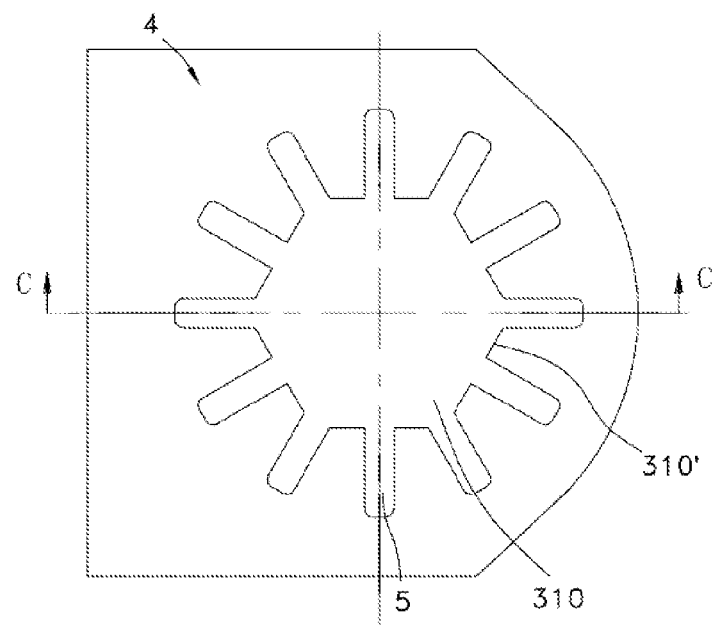
FIG. 13 is a top view of the mating portion of the working component of FIG. 8.
Figure 14:
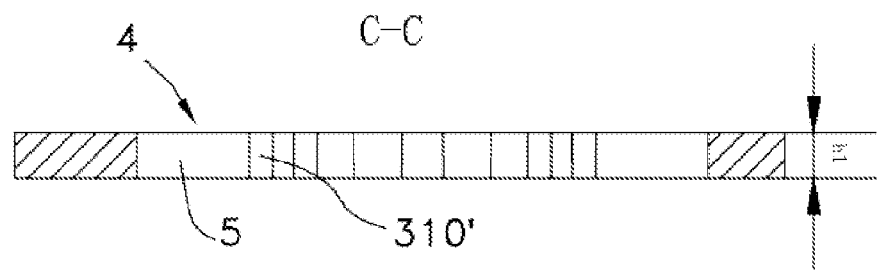
FIG. 14 is a sectional view of the mating portion of FIG. 13 taken along line C-C.

In other embodiments, the working component may be other components which accomplish the process of the work piece by other processing methods, for example, as shown in FIG. 7, the working component is a sanding component having a processing area 3'.

FIGS. 8-14 illustrate a saw blade according to a second embodiment. The saw blade includes a body portion 2 and a clamping portion connected to the body portion. The front end of the body portion 2 includes a saw teeth area 3 which is suitable for acting on the work piece to be processed for cutting. The clamping portion for connecting the saw blade to the shaft end of the tool includes a support portion 1 and a mating portion 4. The support portion 1 of the saw blade is welded with a mating portion 4 for mating with various shaft ends. The support portion 1 is provided with a mounting hole 7 having a longitudinal central axis Y. Once the saw blade is fixed to the shaft end, a fastener such as a bolt may pass through the mounting hole and be connected to the shaft end. The mating portion 4 is provided with a positioning hole 310 which may limit the circumferential movement of the saw blade with regard to the shaft end. The longitudinal axis of the positioning hole 310 and the longitudinal central axis Y of the mounting hole 7 are superposed. From the circumferential edge 310' of the positioning hole 310 which is functioned as the starting position, a plurality of grooves 5 are disposed as extending through along the longitudinal axis Y and extending in the radial direction vertical to the longitudinal direction Y towards the direction far away from the longitudinal axis Y, thus a plurality of projections are formed between the adjacent grooves 5. The projections and the grooves are distributed in the same manner as that in the first embodiment. The difference is that the grooves extend through radially and the projections are separated and independent from each other in the first embodiment, while in the second embodiment, the ends of the grooves towards the longitudinal axis Y are opened in the radial direction, and the ends far away from the longitudinal axis Y are closed, thus the ends of the projections of the mating portion which are far away from the longitudinal axis Y are connected with each other by a connection portion. In the second embodiment, the inner sides of all projections 6 adjacent to the longitudinal axis Y are positioned on the edges of the positioning hole 310.

In the present embodiment, the positioning hole 310 of the mating portion 4 is preferably a regular hexagon, and twelve grooves 5 extending through axially are provided. However, in other embodiments, the shapes, the number of the sides of the positioning hole 310 and the number of the grooves 5 may be different depending on the requirements. The working component of the present embodiment may be directly mounted to the shaft end of various tools that are prevalent in the current market without an additional convertor or adapter, and it also enables use of the fastening system of the tool which includes bolt, spacer, and so on. Additionally, twelve grooves 5 are mutually symmetrical with regard to the longitudinal axis Y, which enables installation with multiple angles of adjustment while keeping the commonality of the saw blade.

The mating portion 4 in this embodiment is preferably formed by a stamping process so as to reduce the manufacturing cost. The thickness of the plate material to be stamped to form a stamping member by a stamping process is not only restricted by the ability of the stamping device and the stamping mold, but also affected by the structure of the stamping member itself. For example, each projection of the mating portion cannot be too thin in the direction of the longitudinal axis Y, otherwise it will affect the strength itself and the match degree with the mating thicknesses of the shaft ends of various tools. However, the projection also cannot be too thick, otherwise it will increase the cost and the projection cannot be stamped. The thickness h1 of the mating portion 4 may preferably satisfy that: $1 \text{ mm} \leq h1 \leq 3 \text{ mm}$, thus it may meet the requirements of the strength and the mating thickness simultaneously. More preferably, the thickness h1 may be 1.8 mm, 2.0 mm, or 2.2 mm. The thickness of the support portion may be h2. Preferably, the whole thickness of the clamping portion of the saw blade formed by the support portion 1 and the mating portion 4 may satisfy that: $1.5 \text{ mm} \leq h1+h2 \leq 6 \text{ mm}$, thus it enables use with the fastening system of all oscillating tools in the current market and makes full use of the strength of the material itself.

In the second embodiment, the support portion 1 and the mating portion 4 of the saw blade are welded together by spot welding. In order to align the positioning hole 310 with the mounting hole 7 exactly in the welding, a tiny projection 220 is formed on the support portion 1 by a stamping process along the longitudinal axis Y. The projection 220 is projected towards the end surface on which the mating portion 4 is welded, an outer edge of the projection 220 and an edge 310' of the positioning hole 310 are substantially the same in shape and size.

The specific welding process will be explained as follows: firstly, the mating portion and the support portion are centered with each other exactly; then, the positions of the welding joints are determined, and at least one circle of the welding joints 40 are positioned on the multiple projections 6 formed between each two adjacent grooves 5. In the oscillating tools, the projections 6 formed between the grooves 5 on the mating portion are mainly used to restrict the circumferential movement of the working component, such as the saw blade, with regard to the output shaft. In the case that the output shaft has certain torsion, the portions of the projections are more adjacent to the longitudinal axis Y, the torques on these portions are smaller, and these portions of the projections are deformed more slightly in the circumferential direction during the working process of the saw blade. Thus, this circle of the welding joints 40 are positioned at the middle of the projections 6 or adjacent to the longitudinal axis Y, which provides enough large welding space for the welding joints on one hand, and on the other hand, enables the welding joints on the projections to be deformed more slightly during the working process of the saw blade and not be prone to failure, so that the welding between the mating portion and the support portion is more firm. The clamping portion of the saw blade also includes a plurality of peripheral welding joints 40'. In order to provide a jointing surface with suitable size between the mating portion 4 and the shaft end of the oscillating tool, an outer profile surface 340 of the mating portion 4 is flush with an outer profile surface 240 of the support portion 1, and the peripheral welding joints 40' are positioned adjacent to the outer profile surfaces to provide double reinforcement assurance for the welding connection between the support portion and the mating portion and enable the jointing therebetween to be more smooth and tight.

In this embodiment, the body portion 2 and the support portion 1 of the saw blade are also connected by welding, and the welding joints 40" are distributed in the width direction of the saw blade. In order to meet the process requirements such as cutting, the material hardness of the body portion of the saw blade is higher than that of the support portion, thereby further reducing the cost of the saw blade.

Figure 15:
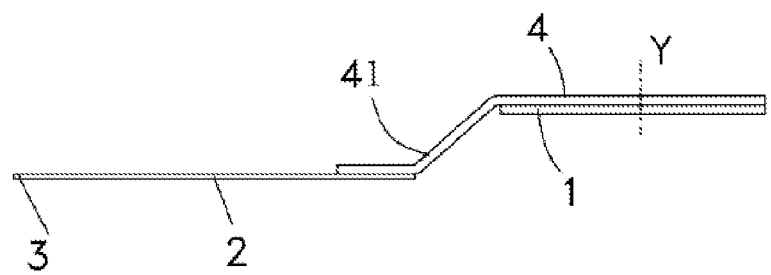
FIG. 15 is a view showing the structure of an exemplary working component for mating with multiple shaft ends according to a third embodiment.

As shown in FIG. 15, a third embodiment differs from the second embodiment in that the mating portion 4 in this embodiment is directly connected to the body portion 2 by a connecting handle portion 41, and then the support portion 1 is directly welded to the mating portion 4. The mating structure of the mating portion 4, the mounting structure of the support portion 1 and the welding connection process between the mating portion 4 and the support portion 1 are the same as those in the second embodiment, and thus will not be explained in details herein.

Figure 16:
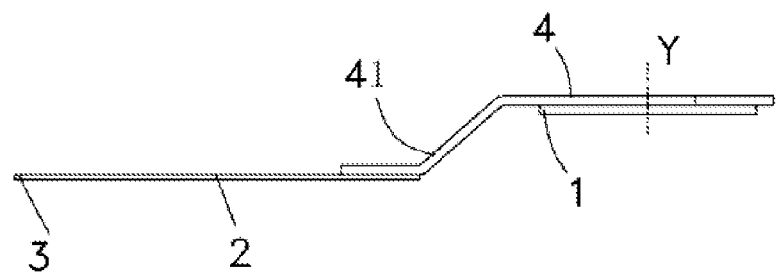
FIG. 16 is a view showing the structure of an exemplary working component for mating with multiple shaft ends according to a fourth embodiment.
Figure 17:
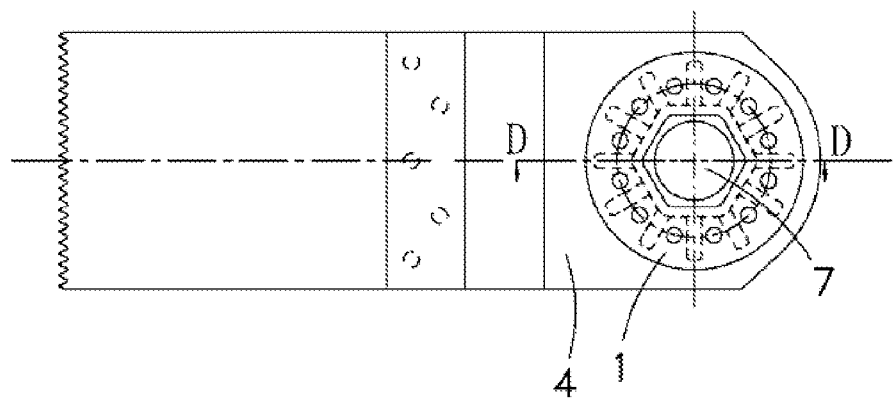
FIG. 17 is a bottom view of the working component of FIG. 16, wherein the invisible portions in the bottom view are indicated by dotted lines.
Figure 18:
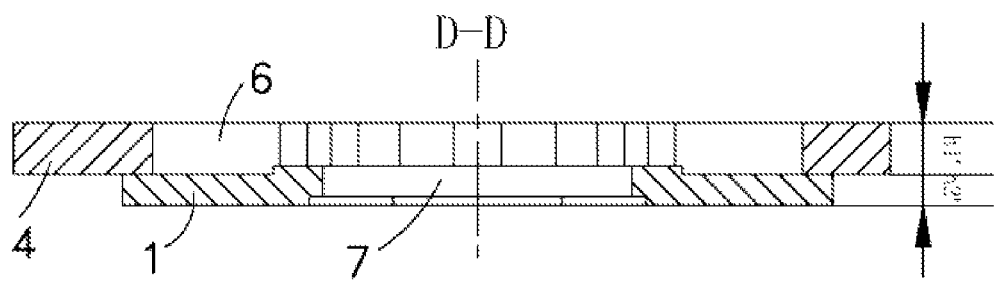
FIG. 18 is a sectional view of the working component of FIG. 17 taken along line D-D.

As shown in FIGS. 16-18, a fourth embodiment differs from the third embodiment in that the outer profile of the support portion 1 is changed from the initial outer profile which coincides with that of the mating portion 4 to a smaller annular outer profile which may also meet the requirements of the mounting strength. The central hole of the annular support portion 1 serves as the mounting hole 7, and the outer radius of the annular support portion 1 meets the requirement that the support portion 1 can still cover the grooves 5 of the mating portion, so that the clamping portion of the saw blade does not have a through hole in the direction of the longitudinal axis Y. Therefore, in the case of mass production, the cost may be further reduced. Meanwhile, the welding joints 40' may also not be required in the process of welding the mating portion 4 and the support portion 1 together, thus simplifying the process.

The mating structure of the mating portion 4 in the fourth embodiment is the same as that in the third embodiment, and thus will not be explained in details herein.

Figure 19:
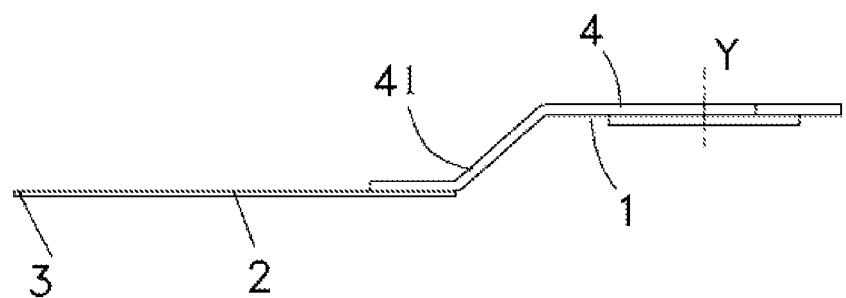
FIG. 19 is a schematic view showing the structure of an exemplary working component for mating with multiple shaft ends according to a fifth embodiment.
Figure 20:
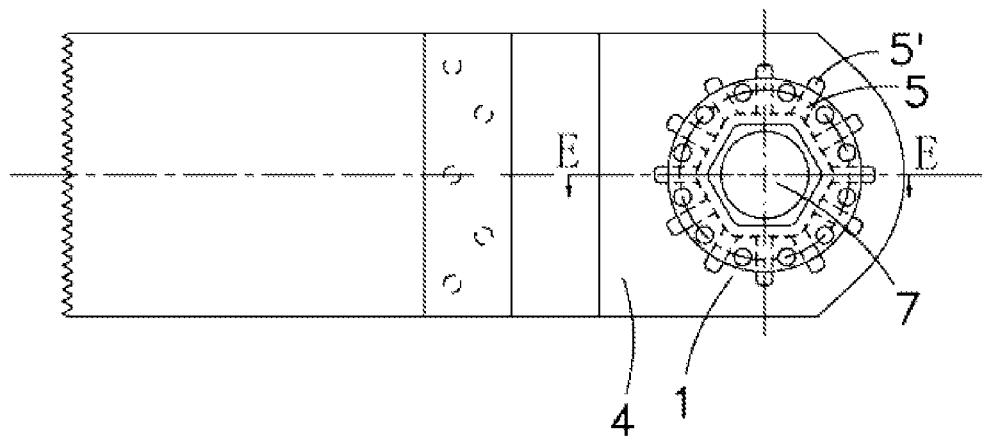
FIG. 20 is a bottom view of the working component of FIG. 19, wherein the invisible portions in the bottom view are indicated by dotted lines.
Figure 21:
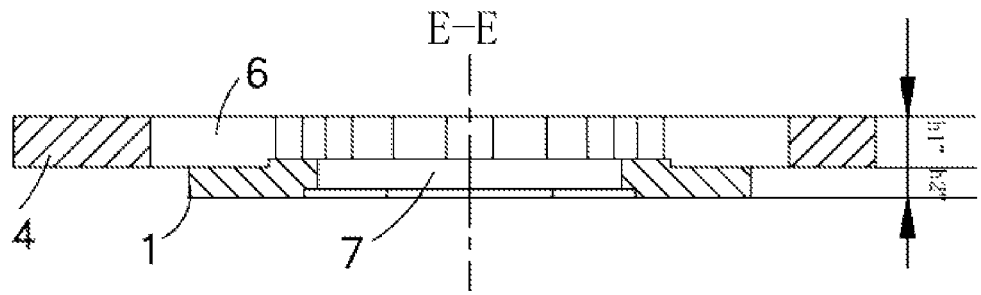
FIG. 21 is a sectional view of the working component of FIG. 20 taken along line E-E.

As shown in FIGS. 19-21, a fifth embodiment differs from the fourth embodiment in that the outer radius of the annular support portion 1 is further reduced so that the grooves 5 on the mating portion 4 which are formed by stamping process and extend through axially cannot be covered completely by the annular support portion 1, thus through holes 5' are formed on the clamping portion of the saw blade in the direction of the axis Y. Each through hole 5' is formed by a bottom of the groove 5 of the mating portion which is far away from the longitudinal axis Y and not covered by the support portion 1. Even if the mating portion 4 is relatively thinner, it is appropriate so long as the total thickness of the support portion and the mating portion is slightly larger than the thickness of the projections distributed on the shaft end of the tool along the direction of the longitudinal axis Y. For example, the projections of the shaft end may pass through the through holes 5' to extend below the underside of the mating portion 4, and it will not conflict with the fastening system so long as it is located above the underside of the support portion.

The mating structure of the mating portion 4, the mounting structure of the support portion 1 and the welding connection process between the mating portion 4 and the support portion 1 are the same as those in the fourth embodiment, and thus will not be explained in details herein.

Figure 22:
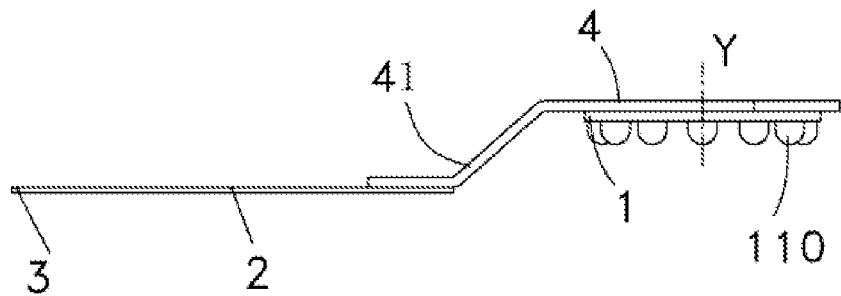
FIG. 22 is a schematic view showing the structure of an exemplary working component for mating with multiple shaft ends according to a sixth embodiment.
Figure 23:
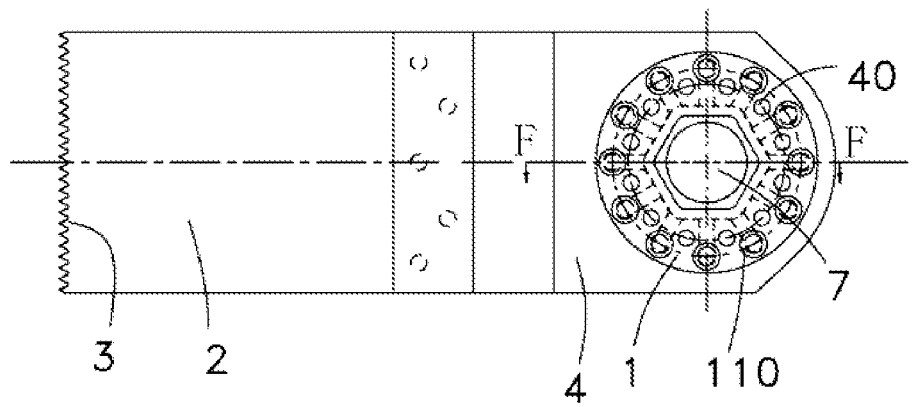
FIG. 23 is a bottom view of the working component of FIG. 22, wherein the invisible portions in the bottom view are indicated by dotted lines.
Figure 24:
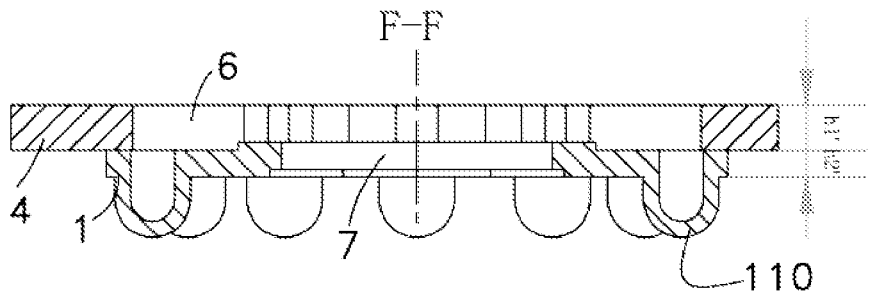
FIG. 24 is a sectional view of the working component of FIG. 23 taken along line F-F.

As shown in FIGS. 22-24, a sixth embodiment differs from the fourth embodiment in that the support portion 1 is further provided with concave portions 110 formed by a stamping process. The concave portions 110 are distributed on the whole circumference and correspond to the bottoms of the grooves 5 of the mating portion which are far away from the longitudinal axis Y. With this arrangement, the thickness of the mating portion 4 may be relatively thinner, and when the height of the projections on the shaft end of the multifunctional tool is larger than the thickness of the mating portion 4, the difference may be offset by the depth of the concave portions 110, that is to say, the projections of the shaft end may extend into the grooves 5 and the concave portions 110 simultaneously.

Figure 25:
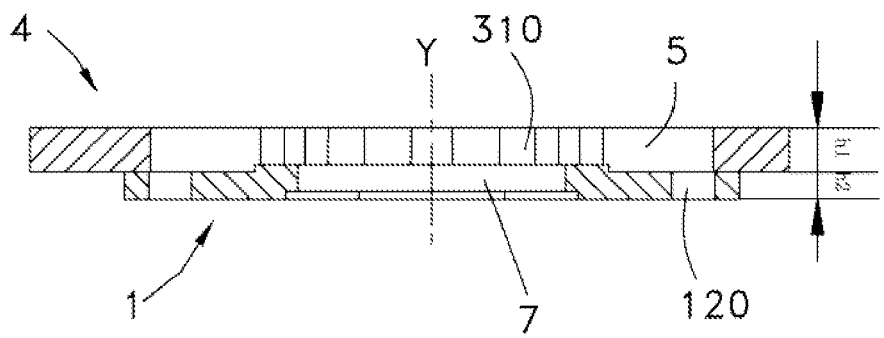
FIG. 25 is a sectional view of a seventh embodiment of the invention.

As shown in FIG. 25, the concave portions 110 in a sixth embodiment may also be replaced by openings 120, that is to say, the materials corresponding to the concave portions 110 on the support portion 1 in the sixth embodiment may be removed directly by a stamping process so as to form the openings 120.

In the above embodiments, the projections and the grooves of the mating portion are uniformly distributed on the whole circumference around the longitudinal axis Y. However, in other embodiments, other arrangements may also be provided.

Figure 26:
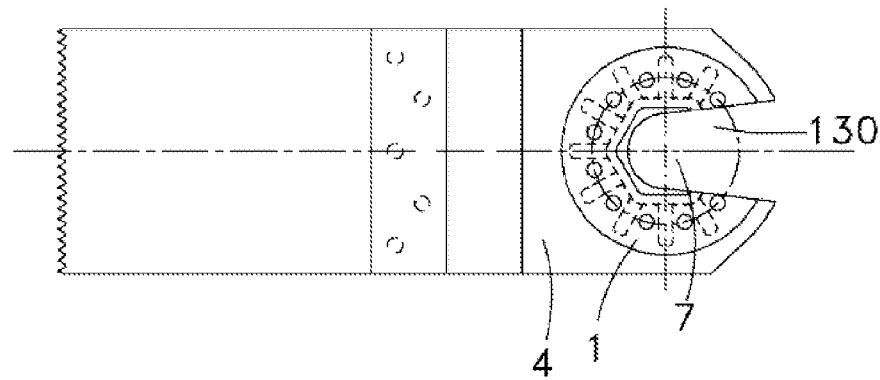
FIG. 26 is a schematic view showing the non-closed structure of an exemplary working component according to an eighth embodiment, which has an opening in the support portion and the mating portion.

As shown in FIG. 26, an eighth embodiment differs from the first to seven embodiments in that an opening 130 is provided on the support portion 1 and the mating portion 4 of the working component along the circumferential direction around the longitudinal axis Y, which is helpful for mounting the working component and saving mounting time, especially for those multifunctional tools with their own quick clamping device, and also increases the commonality for mating. In the eighth embodiment, each projection 6 and each groove 5 are uniformly distributed around the longitudinal axis Y on the circumferential portion of the mating portion 4 except for the opening 130. In the eighth embodiment, preferably at least eight projections are arranged.

The mating structure of the mating portion 4 and the welding connection process between the mating portion 4 and the support portion 1 are the same as those in the above embodiments, and thus will not be explained in details herein.

Figure 27:
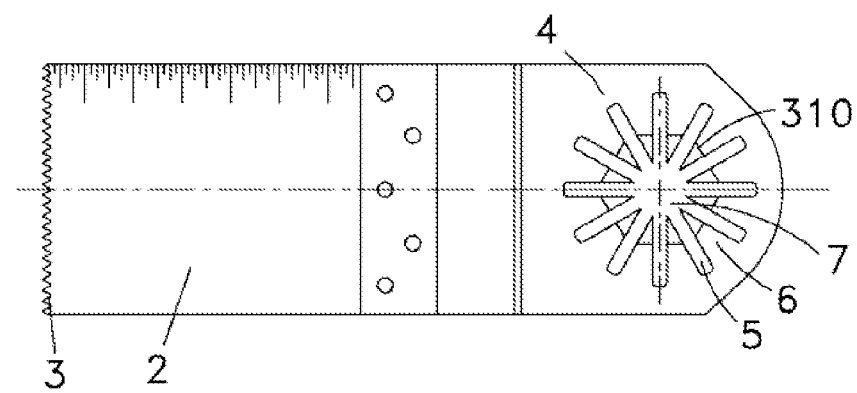
FIG. 27 is a schematic view showing the structure of an exemplary working component for mating with multiple shaft ends according to a ninth embodiment, wherein the body portion is not shown.
Figure 28:
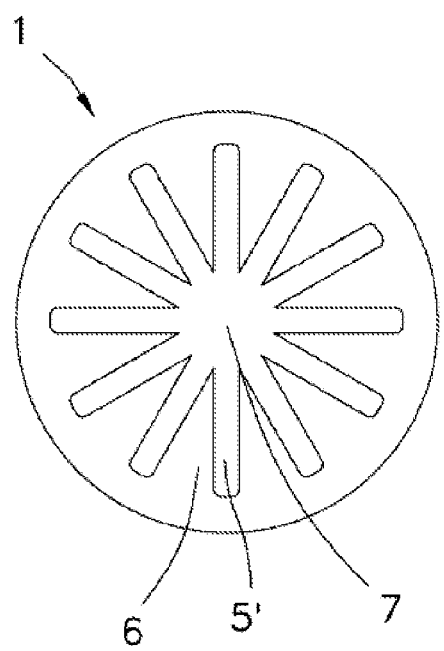
FIG. 28 is a schematic view showing the structure of the support portion of the working component of FIG. 27.

As shown in FIGS. 27-28, in a ninth embodiment, as compared with the above embodiments, the support portion 1 has a plurality of grooves 5'. The grooves 5' extend outward radially from the edge of the mounting hole 7, which further simplifies the stamping process and reduces the cost. Then, when the support portion 1 and the mating portion 4 are welded together, the grooves 5' of the support portion 1 are aligned with the grooves 5 of the mating portion 4, respectively. The mounting hole 7 and the positioning hole 310 may have different shapes and radii, and in this embodiment, the mounting hole 7 is circular, the positioning hole 310 is a regular hexagon, and the minimum distance between each edge of the positioning hole 310 and the longitudinal axis Y is larger than the radius of the mounting hole 7, thus a stepped deviation is formed in the direction of the axis Y, which further enhances the commonality for mating.

In other embodiments, the positioning hole 310 of the present invention may also have the same shape and size as the mounting hole 7.

Figure 29:
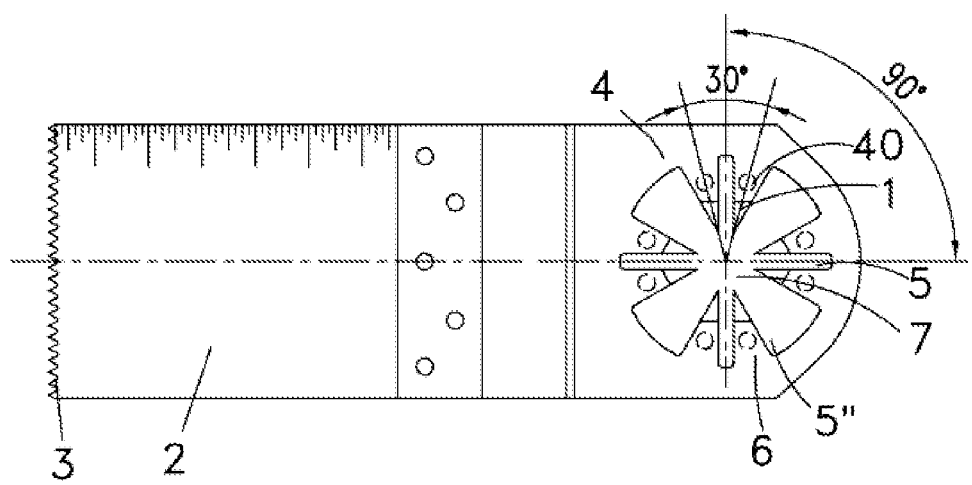
FIG. 29 is a schematic view of an exemplary working component according to a tenth embodiment.

As shown in FIG. 29, in a tenth embodiment the mating portion 4 of the working component may be further modified. For example, based on the ninth embodiment, one projection between each two projections 6 is removed so as to form multiple projection groups which are composed of a pair of adjacent projections 6 respectively. The pair of adjacent projections 6 forming each projection group are separated by a certain angle which is preferably 30 degrees. The welding joints 40 and respective projections 6 are distributed on the circumferential direction around the longitudinal axis Y correspondingly. A relative larger groove 5" is formed between each projection group.

In other embodiments, a projection group may also be composed of three or multiple projections which are separated by such certain angle in sequence, and many projection groups with different number of projections may also be provided.

The structure of the mating portion in the first to eighth embodiments may also be changed similarly.

The working components for mating with multiple shaft ends are not to be limited to the saw blade in the above preferred embodiments but may also include other working components which have the main technical features of being matable with the shaft ends of an oscillating tool for processing materials and cutting materials. For example, the working components may be arranged as sawing tool, grinding tool, cutting tool or scraping tool. Accordingly, the work piece process area of the working components for acting on the materials (the work piece to be processed) may be configured as sawing area, grinding area and edging area. Referring to FIG. 7, it illustrates a sanding working component which may be mated with the output shaft end of the oscillating tool for sanding the materials. The sanding working component is a triangle sanding plate including a clamping portion and a body portion 2, the clamping portion is provided with a mating portion 4'. The mating portion 4' has the same structure as the mating portion 4 of the saw blade, and a grinding area 3' for acting on the work piece to be processed is arranged on the side of the sanding plate opposite to the mating portion 4'. The grinding area 3' may be adhered with a sanding paper, or the grinding materials may be coated directly thereon.

The above description concerning the preferred embodiments and the drawings are only used to describe and explain the contents of the present invention, rather than to restrict the protective scope of the invention. Accordingly, the protective scope of the invention shall be determined only by the appended claims.

What is claimed is:

1. A working component for mating with multiple shaft ends of multiple tools, comprising:
    a body portion; and
    a clamping portion which is connected to the body portion and suitable for mounting the working component to the shaft ends,
    wherein the body portion has a work piece processing area for acting on a work piece to be processed, the clamping portion has a mounting hole with a longitudinal axis (Y), and the clamping portion includes a support portion and a mating portion which are overlapped along the direction of the longitudinal axis (Y),
    wherein at least one of the shaft ends is at least one of a polygon projection, four T-like shaped projections, or a plurality of projections arranged on a circle concentric to the longitudinal axis (Y), and
    the mating portion is provided with a positioning hole, which has the same longitudinal axis (Y) as the mounting hole and a plurality of grooves configured as extending outwards radially from the circumferential edge of the positioning hole so as to form a plurality of projections,
    wherein the positioning hole is a regular polygon having a plurality of equilateral sides and the plurality of grooves are connected with the mounting hole, and
    the grooves are engaged to the shaft end having four T-like shaped projections, when the working component mating with the shaft end having four T-like shaped projections;
    the grooves are engaged to the shaft end having a plurality of projections arranged on a circle concentric to the longitudinal axis (Y), when the working component mating with the shaft end having a plurality of projections arranged on a circle concentric to the longitudinal axis (Y); each of the plurality of projections comprises:
    a first lateral surface extended outwards radially from the longitudinal axis;
    a second lateral surface extended outwards radially from the longitudinal axis; and
    a third lateral surface connected to the first lateral surface and the second lateral surface,
    wherein each of the first lateral surface, the second lateral surface, and the third lateral surface are all parallel to the longitudinal axis (Y),
    wherein the third lateral surface of two adjacent plurality of projections are located at the circumferential edge of the positioning hole, and
    wherein the first lateral surface and the second lateral surface each define an upstanding wall of one of the plurality of grooves; and
    the positioning hole is engaged to the shaft end having a polygon projection, when the working component mating with the shaft end having a polygon projection.

2. The working component for mating with multiple shaft ends according to claim 1, wherein the mating portion and the support portion are fixedly connected with each other.

3. The working component for mating with multiple shaft ends according to claim 2, wherein at least one of the mating portion and the support portion is a stamped member.

4. The working component for mating with multiple shaft ends according to claim 3, wherein a thickness (h1) of the mating portion is at least 1 mm and no more than 3 mm.

5. The working component for mating with multiple shaft ends according to claim 4, wherein a total thickness (h1+h2) after welding the mating portion and the support portion together is at least 1.5 mm and no more than 6 mm.

6. The working component for mating with multiple shaft ends according to claim 1, wherein the plurality of projections are uniformly distributed on the mating portion around the longitudinal central axis (Y).

7. The working component for mating with multiple shaft ends according to claim 6, wherein the grooves at least include two grooves separated by an angle of 30 degrees.

8. The working component for mating with multiple shaft ends according to claim 1, wherein the positioning hole is a regular polygon.

9. The working component for mating with multiple shaft ends according to claim 1, wherein the plurality of projections are formed by a stamping process on an end surface of the support portion on which the mating portion is welded.

10. The working component for mating with multiple shaft ends according to claim 1, wherein at least one of a plurality of openings or concave portions are arranged on the support portion corresponding to the grooves.

11. The working component for mating with multiple shaft ends according to claim 1, wherein the support portion is arranged on an end surface of the mating portion and partly covers the grooves.

12. The working component for mating with multiple shaft ends according to claim 1, wherein the support portion and the mating portion are connected by spot welding and wherein welding joints positioned on the projections are formed between each two adjacent grooves, respectively.

13. The working component for mating with multiple shaft ends according to claim 1, wherein the working component is configured as at least one of a sawing tool, grinding tool, cutting tool, and scraping tool.

14. The working component for mating with multiple shaft ends according to claim 1, wherein the support portion and the mating portion are connected by welding, and the working component includes multiple welding joints positioned at the middle of the projections.

15. The working component for mating with multiple shaft ends according to claim 14, characterized in that the working component further includes welding joints positioned adjacent to outer profiles of the mating portion and the support portion.

16. The working component for mating with multiple shaft ends according to claim 1, wherein the support portion and the mating portion are connected by welding, and the working component includes multiple welding joints positioned adjacent to the longitudinal central axis (Y).

17. A working component as defined in claim 1, wherein each of the plurality of grooves defines a bottom surface extending between the first lateral surface of one of the plurality of projections and the second lateral surface of an adjacent one of the plurality of projections.

18. A working component as defined in claim 1, wherein each of the plurality of grooves extends outwards radially from the circumferential edge of the positioning hole through an outer perimeter of the mating portion.

19. A working component as defined in claim 1, wherein each of the first lateral surface, the second lateral surface, and the third lateral surface are all planar surface.

* * * * *